(No Model.)

P. HAECKLER.
DUST COLLECTOR AND GRAIN CLEANER.

No. 473,662. Patented Apr. 26, 1892.

Witnesses.
J. Jessen.
T. S. Lyon.

Inventor.
Philip Haeckler.
By Paul & Merwin attys.

UNITED STATES PATENT OFFICE.

PHILIP HAECKLER, OF MINNEAPOLIS, MINNESOTA.

DUST-COLLECTOR AND GRAIN-CLEANER.

SPECIFICATION forming part of Letters Patent No. 473,662, dated April 26, 1892.

Application filed August 14, 1891. Serial No. 402,604. (No model.)

*To all whom it may concern:*

Be it known that I, PHILIP HAECKLER, of Minneapolis, in the county of Hennepin and State of Minnesota, have invented certain Improvements in Dust-Collectors and Grain-Cleaners, of which the following is a specification.

My invention relates to means for rapidly and perfectly cleaning grain and for disposing of the dust separated and taken out of the same during the process of cleaning; and its object is to provide devices for doing such work which will be of a simple and economical construction.

My invention consists in various details of construction and in combinations hereinafter described, and particularly pointed out in the claims.

My invention will be more readily understood by reference to the accompanying drawings, in which—

Figure 1:
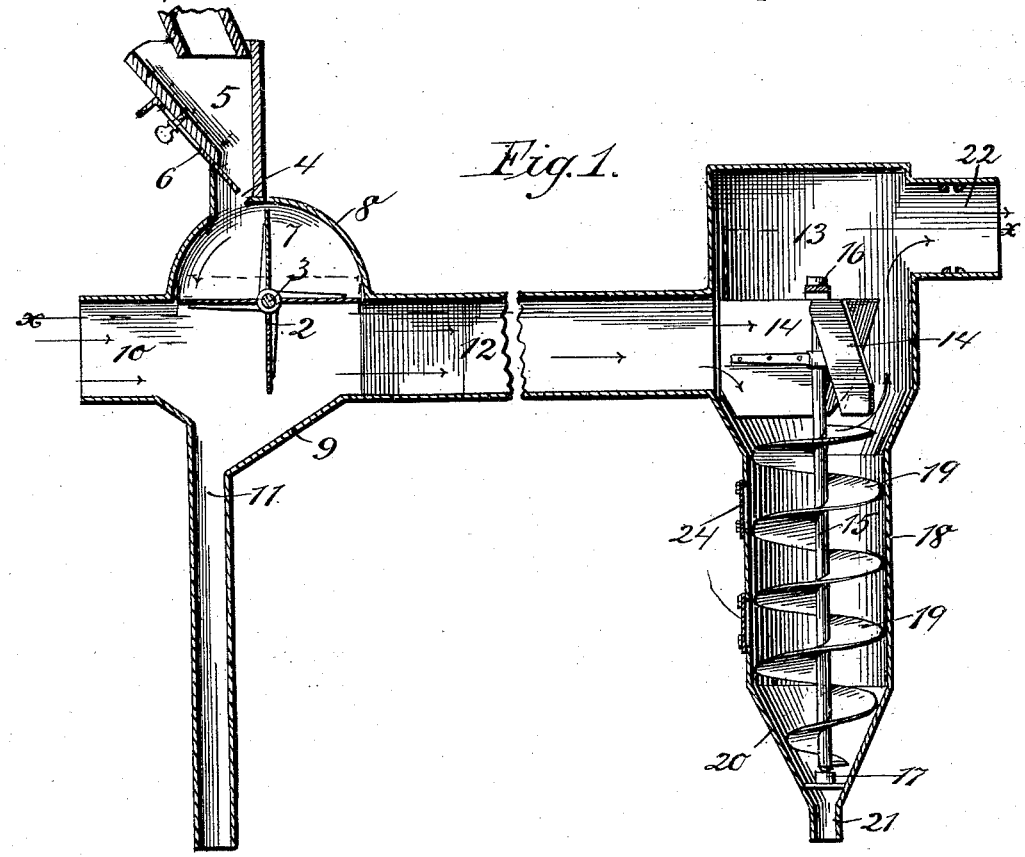
Figure 2:
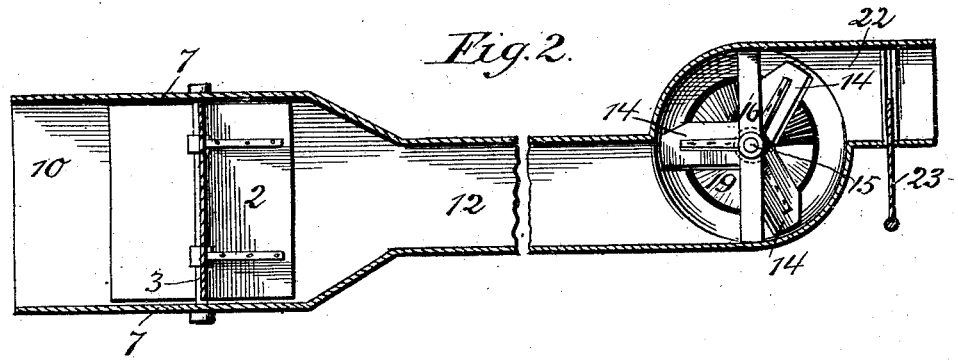

Figure 1 is a vertical section showing apparatus embodying my invention. Fig. 2 is transverse section on the line X X of Fig. 1.

As shown in the drawings, the fan 2 is arranged on the shaft 3 and has the four wings adapted to revolve beneath the discharge-opening 4 of the grain-hopper 5. The width of this opening 4 may be regulated by raising or lowering the adjustable slide 6, thereby regulating the stream of grain issuing from the hopper 5. The fan 2 is inclosed in the case having the end walls 7 and the curved top 8 and the hopper-bottom 9. The grain falling from the hopper 5 acts upon the fan just as falling water does on a water-wheel, turning the same in the direction of the arrows. The revolution of the fan causes a suction of air through the air duct or inlet 10 and through the discharge-spout 11. The air thus pumped into the fan-case is discharged through the discharge-duct 12, leading into the dust-collector chamber 13. The pipe 12 enters the dust-collector at a tangent and the air strikes against the downwardly-inclined fans 14 of the vertically-arranged wind-wheel provided in the dust-collector, being thereby deflected into the lower part of the dust-collecting chamber. This wheel is secured on the vertical shaft 15, having bearing and cross pieces 16 and 17 placed in the top and bottom of the dust-collector, as shown. The lower part of the dust-collector is formed by the extension 18, of smaller diameter than the chamber 13. The direct passage down through the part 18 is closed by the spiral flights 19, arranged on the shaft 15. The lower part of the device is closed by the cone 20, having the small spout 21. The upper part of the chamber 13 is entirely vacant and forms a settling-chamber, from which the dust drops back onto the flights of the conveyer to be carried thereby down to the lower hopper. The air thus freed from the dust is discharged through the outlet 22. It is desirable, however, to force enough air down the spiral flights to push the dust down the same. The slide-valve 23 is provided in the outlet 22 for the proper regulation of the air-discharge, the required size of the opening being thus dependent entirely upon the velocity of the air-currents.

I preferably provide two doors 24 in the wall of the part 18 to render access to the spiral flights easy, and therefore making it convenient to remove any obstacles which may lodge therein.

Having thus described my invention, I claim as new and desire to secure by Letters Patent—

1. The combination, with the hopper 5, provided with the narrow opening or mouth 4, of means for limiting the width of the opening, the semi-cylindrical casing 8, having the lower portion provided with a large air-inlet 10 and with the inclined hopper-plate 9, the small spout 11, extending therefrom, a dust-laden air-duct 12, and the shaft 3, loosely fixed in bearings in the ends of said casing and provided with a series of wings 2, upon which the stream of grain from the mouth 4 continuously falls, and means for disposing of the dust passing off through the duct 12, substantially as described.

2. The combination, with the hopper 5, having the narrow discharge or mouth 4, of the shaft 3, provided with the wings 2 and arranged to continuously present one of its wings beneath the mouth 4, the casing 8 of the same, a large free air-inlet 10, a hopper and spout to conduct the grain from the lower part of the casing, a dust-laden air-duct 12, the chamber 13, free in its upper part and having in its lower portion the vertically-arranged fan, the inclined wings 14 of said fan, the lower chamber 18, into which the air is directed by the incline of said wings 14, and a purified-air discharge 22, extending from the upper portion of the chamber 13, substantially as described.

3. The combination, with the chamber 13, of the pipe 12, entering the lower portion of the same at a tangent, a vertically-arranged spindle 15, the portion 18, provided with doors 24, a spiral dust-conveyer provided on said spindle, the upper portion of the chamber 13 being free and open, the air-discharge 22, and the regulating-valve, all substantially as described.

In testimony whereof I have hereunto set my hand this 11th day of August, 1891.

PHILIP HAECKLER.

In presence of—
FRED. S. LYON,
C. E. VAN DOREN.